Patented Jan. 17, 1939

2,143,888

UNITED STATES PATENT OFFICE 2,143,888

PROCESS OF POLISHING A FORMALDEHYDE RESIN

Carl W. Kuehne, Millburn Township, N. J., assignor to Kuehne Chemical Company, a corporation of New Jersey No Drawing. Application August 17, 1935, Serial No. 36,651

8 Claims. (Cl. 18—48)

This invention relates to a process of polishing a formaldehyde resin, and is a continuation in part of my co-pending application, Ser. No. 32,754, filed July 23, 1935, for Process of polishing phenol-formaldehyde resins.

An object of the invention is to provide an easy, inexpensive, and quick method of polishing a formaldehyde resin.

Heretofore such resins were usually polished by placing the same in a drum in the presence of liquid abrasive material and rotating the drum for a long period of time, in some cases up to sixty hours. The length of time required for such polishing is objectionable and expensive. I have discovered that formaldehyde resins can be polished by subjecting them to the action of an aqueous alkaline hypochlorite solution, preferably at elevated temperatures. The resins are then washed with water or other suitable liquid. If, during this treatment, the color of the resins has changed, such color can be restored by merely dipping the resins in an aqueous acid, preferably a mineral acid, such as sulphuric acid.

The formaldehyde resins include all resins which can be prepared by condensation or condensation and polymerization of formaldehyde and another substance, such as phenol, urea, thiourea, etc. The expression, formaldehyde resins, however, does not include substances which are waterproofed by means of formaldehyde, such as casein. Formaldehyde resins also include articles made of the same and containing fillers, diluents, etc., such as are commonly used in plastics. Hypochlorites which are stable in alkaline solution may be used, such as sodium hypochlorite, potassium hypochlorite, calcium hypochlorite, are commercially obtainable and are ordinarily sold as aqueous solutions, containing various amounts of free alkali. In some cases the hypochlorite solution may contain sufficient free alkali to give the desired alkalinity, according to this invention, but if not, sufficient alkali should be added to bring the solution up to the desired alkalinity. In general, the alkaline hypochlorite solution to be used should not contain more alkali than hypochlorite, and very good results are obtained with a solution containing about 4% hypochlorite and about .3% to 1% free alkali.

The resins to be polished may be added directly to a vessel containing the alkaline hypochlorite solution at the desired temperature, or the resins may be placed in a suitable container, such as a wire basket, and the basket dipped in the alkaline hypochlorite solution. Where numerous objects are to be treated in one operation, agitation is desirable to permit contact of the hypochlorite solution with all the objects and to provide uniform polishing. My invention is further distinguished in that a uniform polish can be given to objects of irregular shape and fine indentations.

In carrying out the invention, the resin objects may be immersed in a 4% aqueous sodium hypochlorite solution containing .3% to 1% free sodium hydroxide. The polishing operation can be accelerated by treatment at elevated temperatures; for example phenol-formaldehyde resins can be quickly polished by treatment at above 75° C., the time required at 100° C. being about four to five minutes. Urea and thiourea resins can be polished in about two minutes at 50 to 60° C. The resins are then removed, and washed with water. If desired, they can then be dipped in 1% aqueous sulphuric acid for about one minute, and then removed. It is, of course, obvious that the resins need not be washed with water if they are to receive a subsequent acid treatment. The resins have a good color and a high polish.

The foregoing description is for purposes of illustration and not of limitation, and it is, therefore, my intention that the invention be limited only by the appended claims or their equivalents, in which I have endeavored to claim broadly all inherent novelty.

I claim:—

1. Process of treating a formed formaldehyde resin to obtain a polished surface thereon comprising subjecting said resin to the action of an aqueous solution containing a hypochlorite and free alkali in amount not greater than the amount of hypochlorite.

2. Process of treating a formed formaldehyde resin to obtain a polished surface thereon comprising subjecting said resin to the action of an aqueous solution containing a hypochlorite and free alkali in amount not greater than the amount of hypochlorite, at above 75° C.

3. Process of treating a formed formaldehyde resin to obtain a polished surface thereon comprising subjecting said resin to the action of an aqueous solution containing a hypochlorite and free alkali in amount not greater than the amount of hypochlorite, at above 75° C., removing said resin from said solution, and subjecting said resin to the action of an aqueous acid.

4. Process of treating a formed phenol formaldehyde resin to obtain a polished surface thereon comprising subjecting said resin to the action of an aqueous solution containing a hypochlorite and free alkali in amount not greater than the amount of hypochlorite, at above 75° C., removing said resin from said solution, and subjecting said resin to the action of an aqueous acid.

5. Process of treating a formed urea formaldehyde resin to obtain a polished surface thereon comprising subjecting said resin to the action of an aqueous hypochlorite solution at an alkaline pH up to 60° C., said solution containing free alkali in amount not greater than the amount of hypochlorite.

6. Process of treating a formed urea formaldehyde resin to obtain a polished surface thereon comprising subjecting said resin to the action of an aqueous hypochlorite solution containing free alkali in amount not greater than the amount of hypochlorite, removing said resin from said solution, and subjecting it to the action of an aqueous acid.

7. Process of treating a formed thiourea formaldehyde resin to obtain a polished surface thereon comprising subjecting said resin to the action of an aqueous hypochlorite solution at an alkaline pH up to 60° C., said solution containing free alkali in amount not greater than the amount of hypochlorite.

8. Process of treating a formed thiourea formaldehyde resin to obtain a polished surface thereon comprising subjecting said resin to the action of an aqueous hypochlorite solution containing free alkali in amount not greater than the amount of hypochlorite, removing said resin from said solution, and subjecting it to the action of an aqueous acid.

CARL W. KUEHNE.